Patented Nov. 1, 1927.

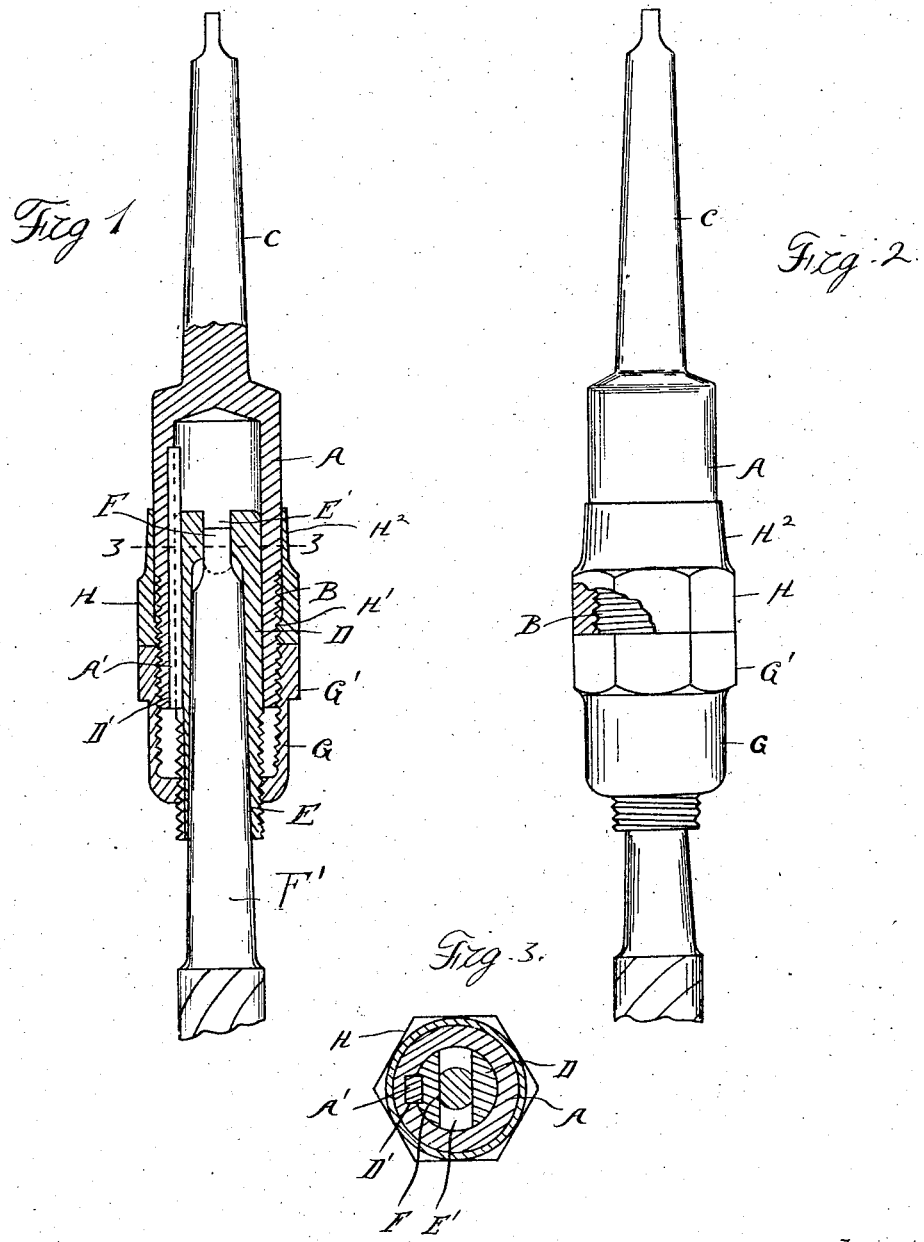

1,647,747

UNITED STATES PATENT OFFICE.

JOHN PROKOP, OF DETROIT, MICHIGAN, ASSIGNOR OF ONE-HALF TO FRANK V. ELBERTZ, OF DETROIT, MICHIGAN.

EXTENSIBLE SPINDLE.

Application filed August 4, 1924. Serial No. 730,127.

The invention relates to extensible spindles adapted for use in adjusting machine tools such as multiple drills and the like and the primary object is to provide a simple adjusting device capable of being used with the standard type of tools.

According to the present practice, it is difficult to adjust the various drills in a multiple drill press head so that the points lie in a common plane since the drills are often of various lengths due to sharpening. To overcome this difficulty I have provided a device which is capable of being inserted in the socket of the drill head ordinarily receiving the tang of the drill and having a corresponding socket at its opposite end capable of longitudinal adjustment with respect thereto. With this device, therefore, it is a simple matter to set the drills at the required length.

In the drawings:—

Figure 1 is an elevation of my improved device;

Figure 2 is a longitudinal section thereof;

Figure 3 is a section on the line 3—3 of Figure 1.

As specifically illustrated in the drawings, A is a tubular member exteriorly threaded at B with a right-hand thread and provided with a tapered shank or tang C similar to that found upon the drills or other tools in conjunction with which the device is to be used. D is a member telescopically engaging the outer tube A and provided with a longitudinal slot D' engageable with the spline or key A' in the member A. The member D is provided with a tapering socket E, the upper end of which terminates in a transverse slot E' for receiving the flattened end F of the drill or other tool F'. The opposite end of the member D is exteriorly threaded with a left-hand thread.

G is the adjusting nut provided with the polygonal gripping surface G' and being interiorly threaded with both right and left-hand threads, the former being of a diameter to engage the threaded end of the tubular member A and the latter, or left-hand threaded portion being of reduced diameter to engage the left-hand threads of the inner member D. Thus, by rotating the adjusting nut G, a relative longitudinal movement is imparted to the inner and outer members D and A, thereby adjusting the distance of the drill F' from the tang C.

In order to lock the device in adjusted position, there is provided a lock nut H having the interior threads H' at one end thereof, the lock nut preferably being counterbored to form the sleeve H² slidably engaging the cylindrical surface of the member A.

The device as above described forms an adapter which may be inserted in the socket of a drill press or other machine tool and contains a corresponding socket for receiving the tang of the drill. Rotation is prevented by means of the spline A' while the drill may be longitudinally adjusted by rotating the nut G until the drill is of the proper length, whereupon the lock nut H may be tightened to maintain the position of adjustment.

It is obvious that the device may be modified from the specific arrangement shown to accomplish the same results and instead of providing the right-hand and left-hand threads upon the adjusting member G, the latter may be rotatably secured to either of the telescopic members while having a threaded engagement with the other member. It is preferable that the tang C of the outer member should be complementary to the socket E in the inner member since with this arrangement the adapter forms a coupling capable of being unseated in socket of the ordinary machine and to itself receive the shank of the drill or other tool designed to be inserted in said socket.

The device as herein described and illustrated is adapted to be used with a large number of commercial machines such as the Cone automatic, Bretan automatic, B & S automatic, Gridley, Cleveland automatic, J & L double spindle boring mills and others. It may also be used for multiple or gang drilling, tapping and reaming.

What I claim as my invention is:—

1. An adapter for machine tools comprising a pair of telescopically engaging members, a permanent connection between said members preventing relative rotation thereof while permitting relative longitudinal movement, a sleeve threadedly engaging both of said members, the outer of said members being provided with a tang and the inner member having a corresponding socket, and means for locking said sleeve in adjusted position.

2. An adapter for machine tools comprising a pair of telescopically engaging members, one being provided with a longitudinal slot, a spline upon the other of said members engaging said slot, a tang on the outer of said telescopic members, a socket in the inner of said members, right-hand threads upon one of said members, left-hand threads upon the other of said members, a sleeve interiorly threaded to engage both said right-hand and said left-hand threads, and a lock nut engaging the threads on one of said members.

3. An adapter for machine tools comprising a tubular member having exterior threads at one end thereof, a tang extending from the opposite end thereof, a second member having a splined telescopic engagement with said first-mentioned member, and provided with exterior threads of the opposite hand, said member being also provided with a socket complementary to the tang on said first-mentioned member, a sleeve having right and left-handed interior threads engageable with the corresponding threads on said telescopic members, and a lock nut engaging the threads on said first-mentioned member.

4. An adapter for machine tools comprising an outer tubular member having a tang at one end thereof, an inner member telescopically engaging said outer member, one of said members provided with a slot, a spline extending longitudinally of and secured to the other of said members and engaging said slot, a sleeve having a portion threadedly engaging said outer member and a reduced portion threadedly engaging said inner member, and means for locking said sleeve in adjusted position.

In testimony whereof I affix my signature.

JOHN PROKOP.